Figure 1:
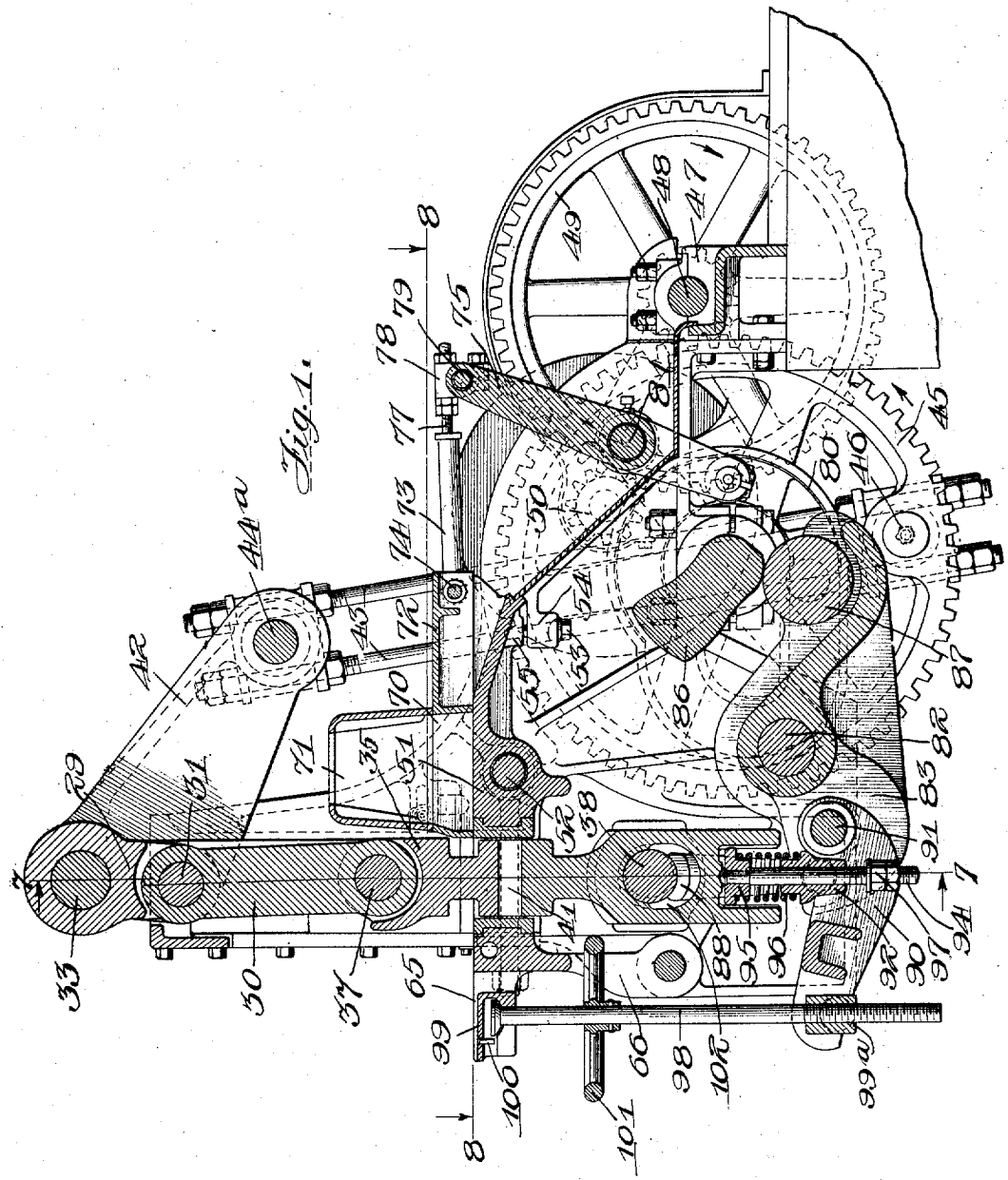

No. 868,515. PATENTED OCT. 15, 1907.
B. C. WHITE.
BRICK MACHINE.
APPLICATION FILED FEB. 23, 1906.

12 SHEETS—SHEET 1.

No. 868,515. PATENTED OCT. 15, 1907.
B. C. WHITE.
BRICK MACHINE.
APPLICATION FILED FEB. 23, 1906.

12 SHEETS—SHEET 4.

No. 868,515. PATENTED OCT. 15, 1907.
B. C. WHITE.
BRICK MACHINE.
APPLICATION FILED FEB. 23, 1906.

12 SHEETS—SHEET 6.

Witnesses:
Inventor:
Bruce C. White

No. 868,515. PATENTED OCT. 15, 1907.
B. C. WHITE.
BRICK MACHINE.
APPLICATION FILED FEB. 23, 1906.
12 SHEETS—SHEET 7.
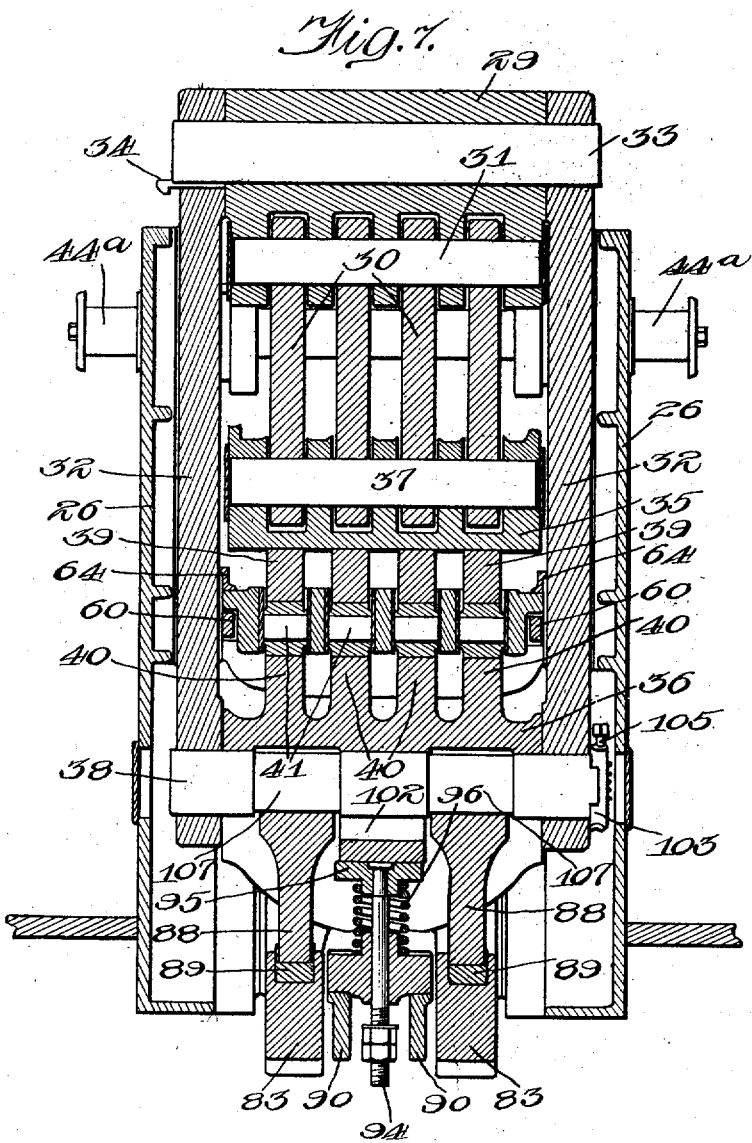

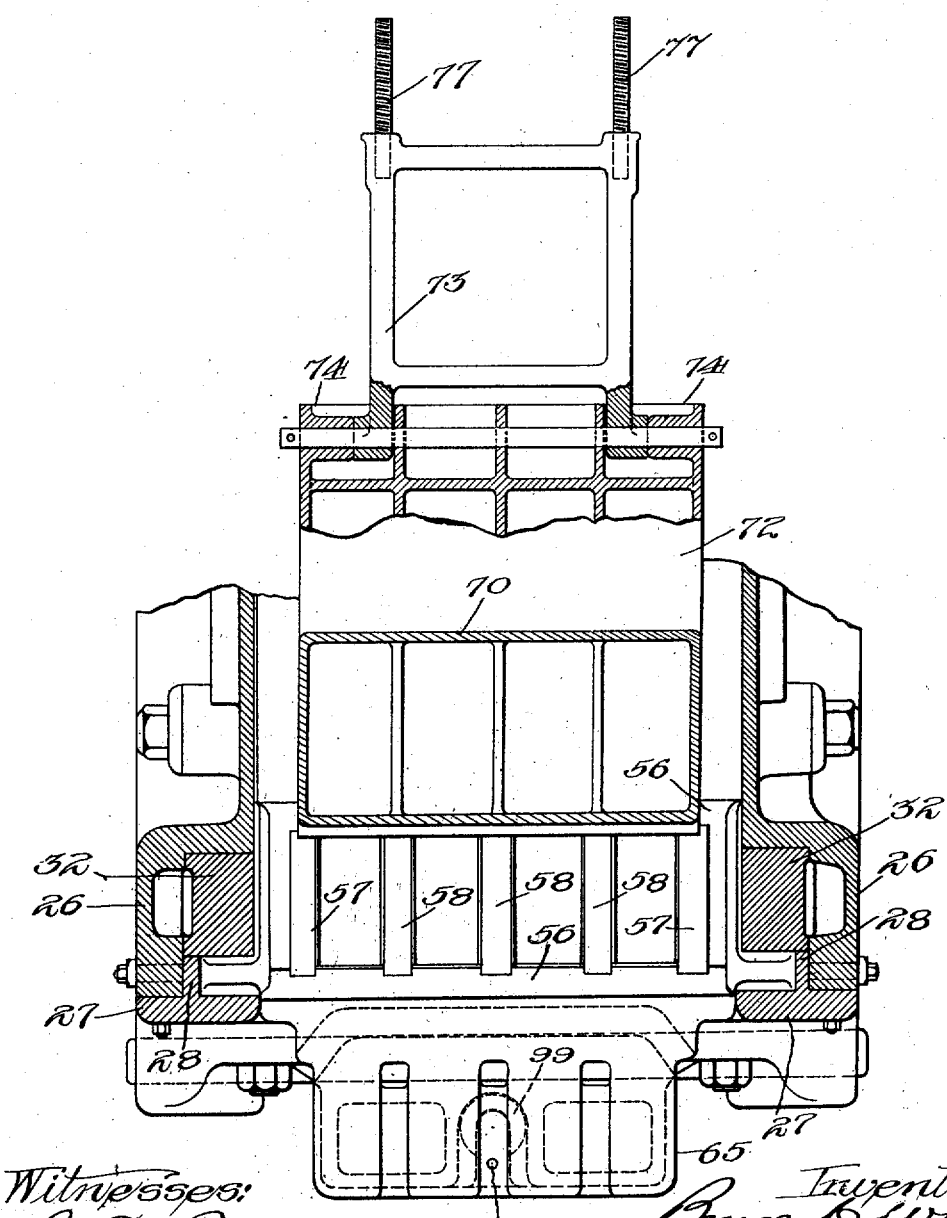

No. 868,515. PATENTED OCT. 15, 1907.
B. C. WHITE.
BRICK MACHINE.
APPLICATION FILED FEB. 23, 1906.
12 SHEETS—SHEET 9.
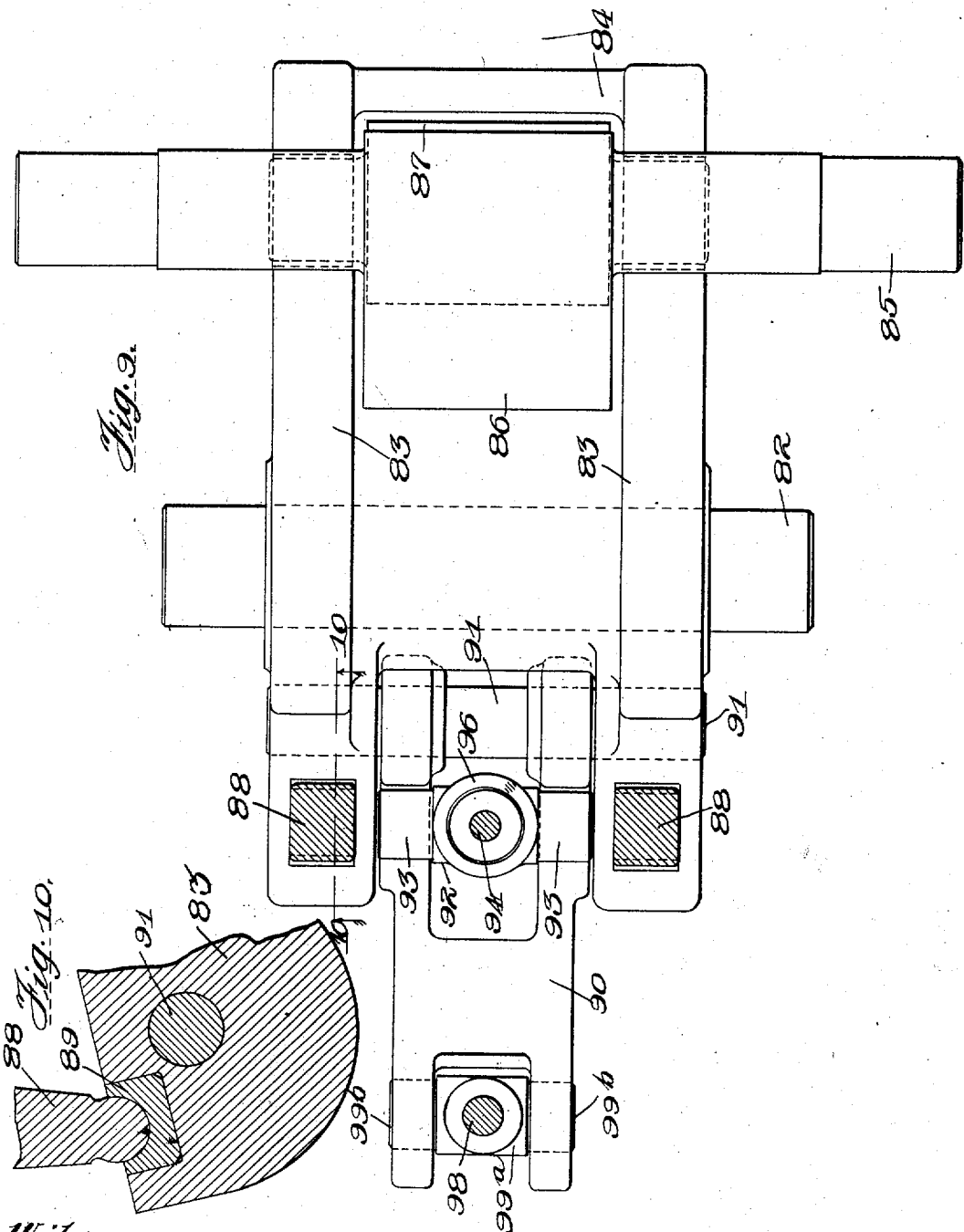

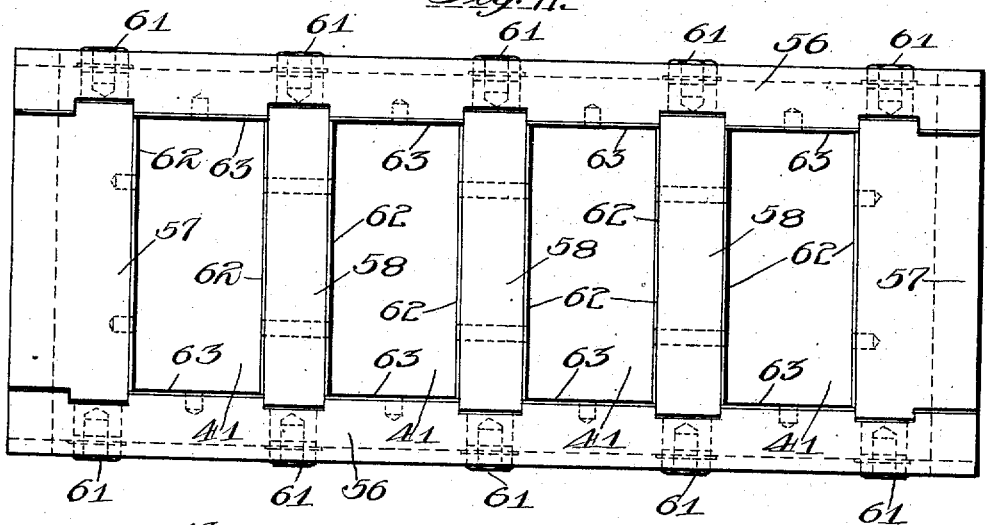
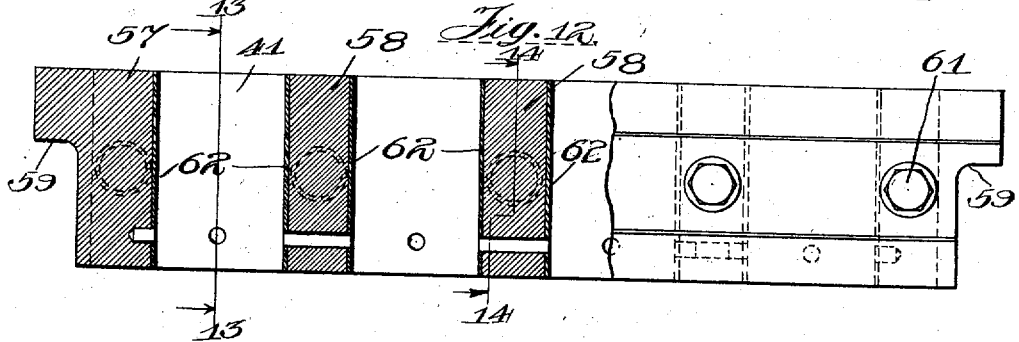
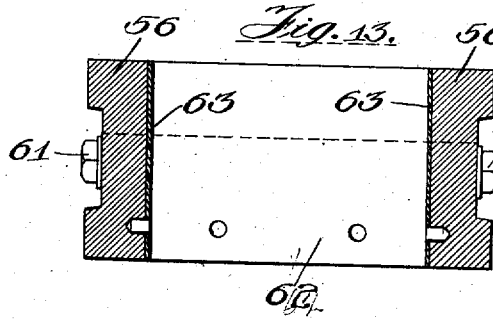
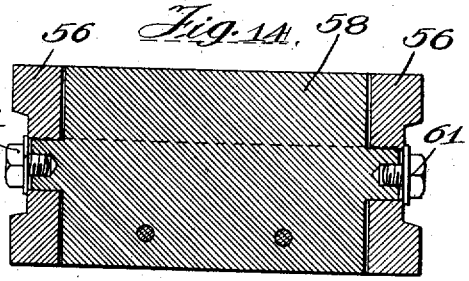

No. 868,515.　　　　　　　　　　　　　　　PATENTED OCT. 15, 1907.
B. C. WHITE.
BRICK MACHINE.
APPLICATION FILED FEB. 23, 1906.

12 SHEETS—SHEET 11.

Witnesses:　　　　　　　　　　　　　　　Inventor:
　　　　　　　　　　　　　　　　　Bruce C. White

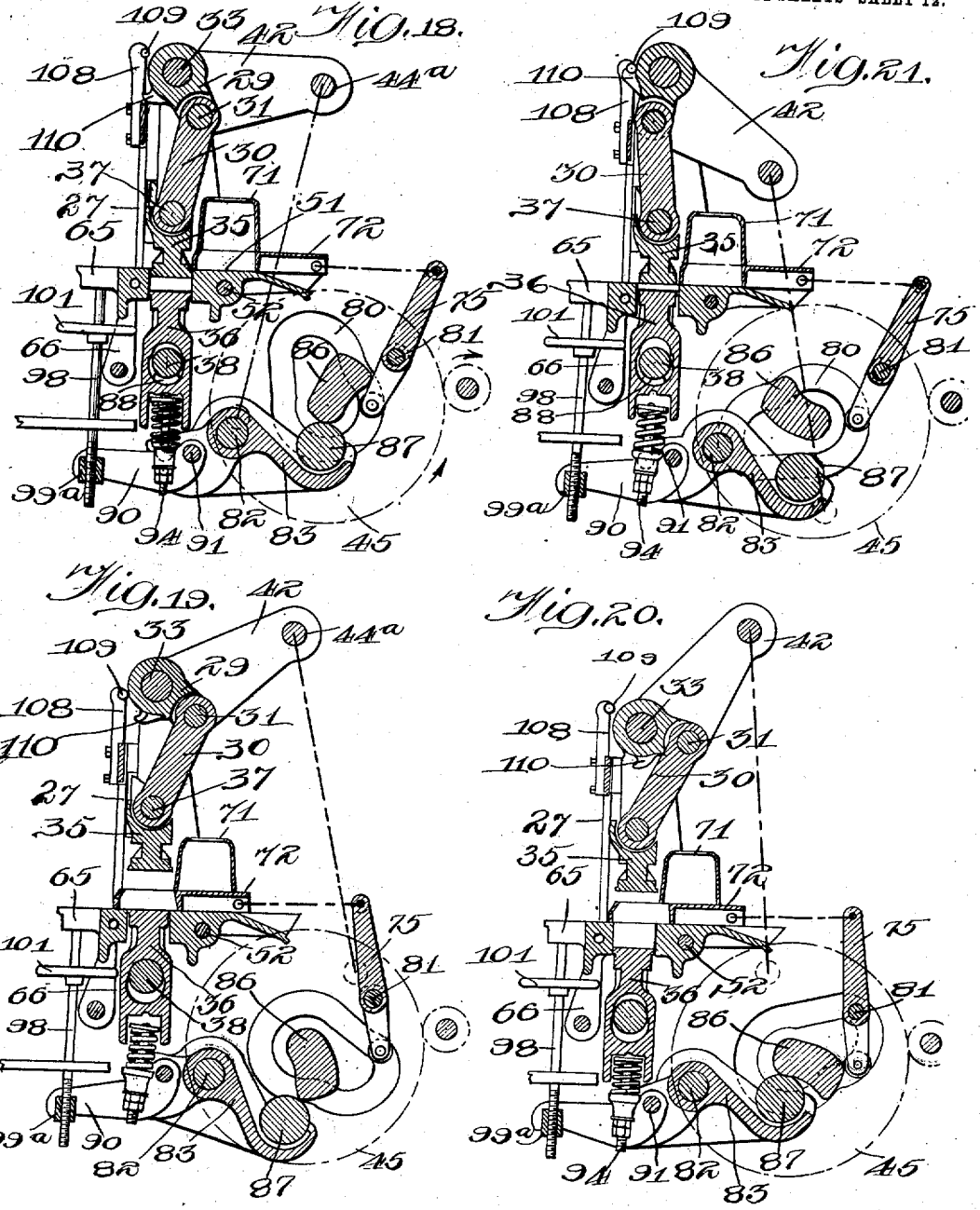

UNITED STATES PATENT OFFICE.

BRUCE C. WHITE, OF CHICAGO, ILLINOIS.

BRICK-MACHINE.

No. 868,515.  Specification of Letters Patent.  Patented Oct. 15, 1907.

Application filed February 23, 1906. Serial No. 302,614.

*To all whom it may concern:*

Be it known that I, BRUCE C. WHITE, a citizen of the United States, residing at Chicago, county of Cook, State of Illinois, have invented certain new and useful Improvements in Brick-Machines, of which the following is a full and complete description, reference being had to the accompanying drawings.

This invention relates to brick machines of that type employing a toggle for suitably operating opposing plungers that are employed for pressing into bricks clay or other material that is fed into molds. In this type of machine, one plunger or set of plungers is connected with a cross-head that is pivotally secured to one of the members of the toggle, while the other toggle is connected to the other plunger or set of plungers through the medium of sliding bars arranged to move vertically in suitable guiding supports. In all prior machines of this general type, the toggle members have been moved to bring them into or out of alinement—that is to straighten or flex the toggles—by means of a rod extending rearwardly from the toggle-joint and actuated by suitable crank mechanism, such rearward extension of the rod being in a substantially horizontal line. Arranging in this manner the connecting arm that actuates the toggle is objectionable in that it subjects the frame and particularly the upright guides in which travel the sliding bars that connect one of the cross-heads to one of the toggle members to excessive strain due to the crank thrust.
It is one of the leading objects of my present invention to provide a construction that will obviate this objection, which, broadly stated, I accomplish by means of a connecting rod that is given an upward and downward movement by a suitably located crank with which its lower end is connected, its upper end being connected to a laterally projecting arm connected with the toggle, such laterally projecting arm, in the construction shown, constituting a bell-crank lever, the portion of the arm at the short side of the bell-crank forming one of the members of the toggle.

There are many advantages in the construction and operation of the machine as a whole other than relieving the frame and vertical guide bars from the crank thrust referred to that are attributable to this feature of construction, which advantages will more clearly appear when the machine has been described in detail, and hence their enumeration is omitted at this point.

Other objects of the invention are to provide improved means for forcing the lower plungers up to discharge the finished bricks from the mold; to provide improved means for regulating the height of the plunger within the mold in order to regulate the amount of material to be deposited in the mold; to provide improved means for compensating for such wear of the parts as would prevent the lower plungers from rising flush with the surface of the table on which the finished bricks are to be slid upon their ejection from the mold; to provide an improved mold box or frame; to provide improved means for permitting the insertion in and removal from the machine of mold boxes or frames, and for holding such mold boxes or frames in place in the machine; to provide improved means for actuating the feed box or charger that carries material to the molds;—and to improve generally the construction and operation of brick machines of the general type hereinbefore specified.

I accomplish these objects by the devices and combinations of devices shown in the drawings and hereinafter specifically described.

That which I believe to be new will be pointed out in the claims.

Figure 2:
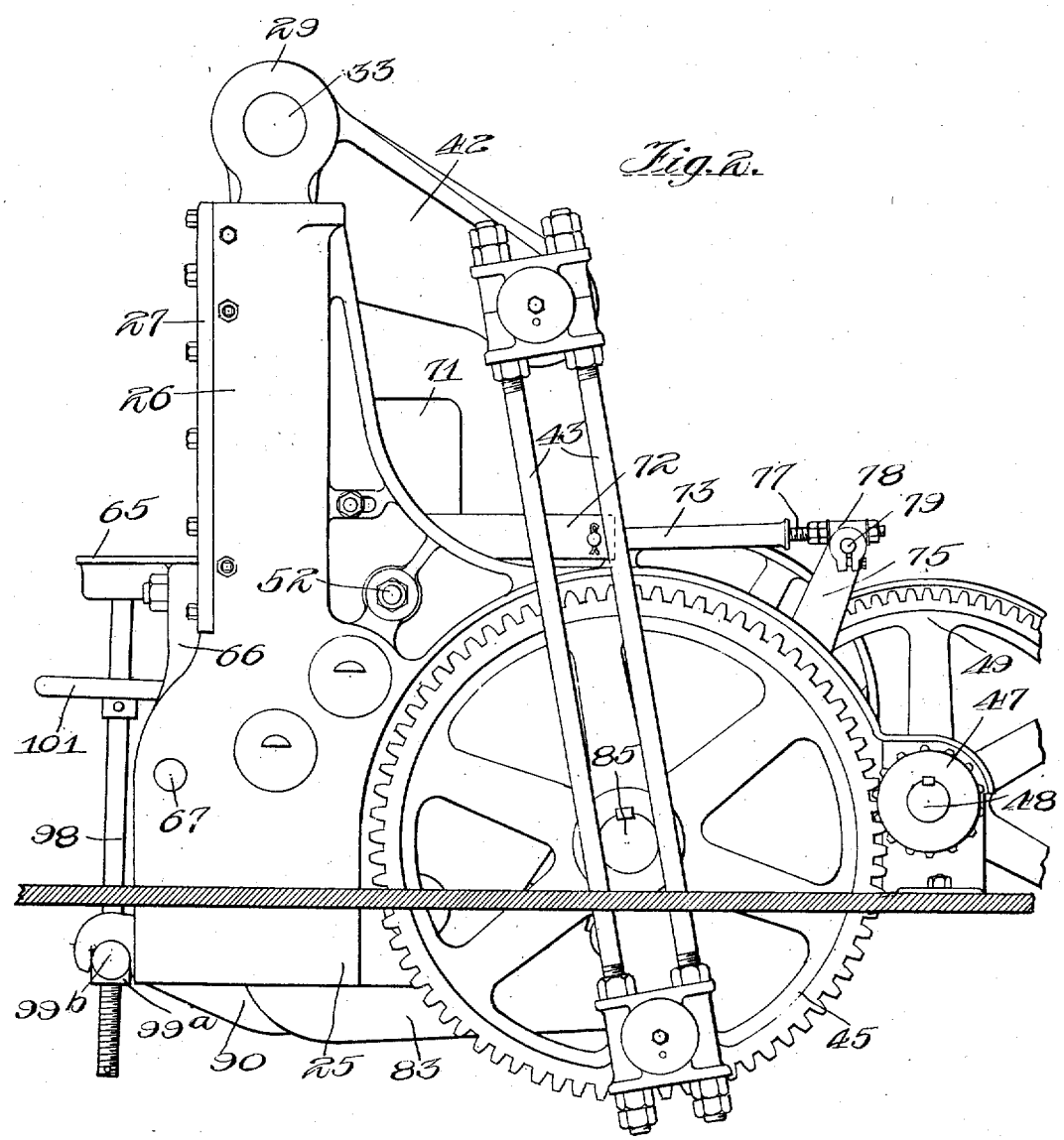
Figure 3:
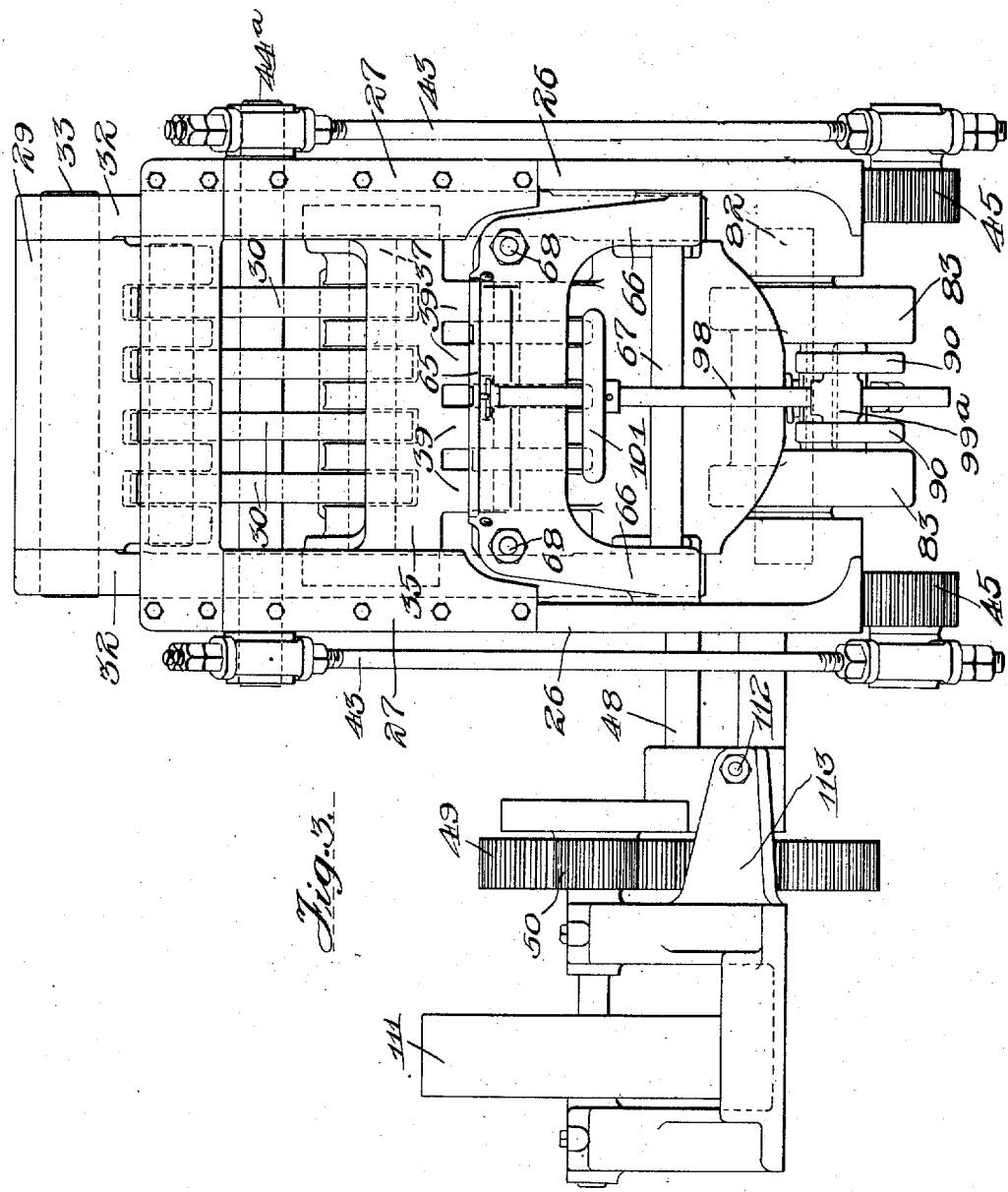
Figure 4:
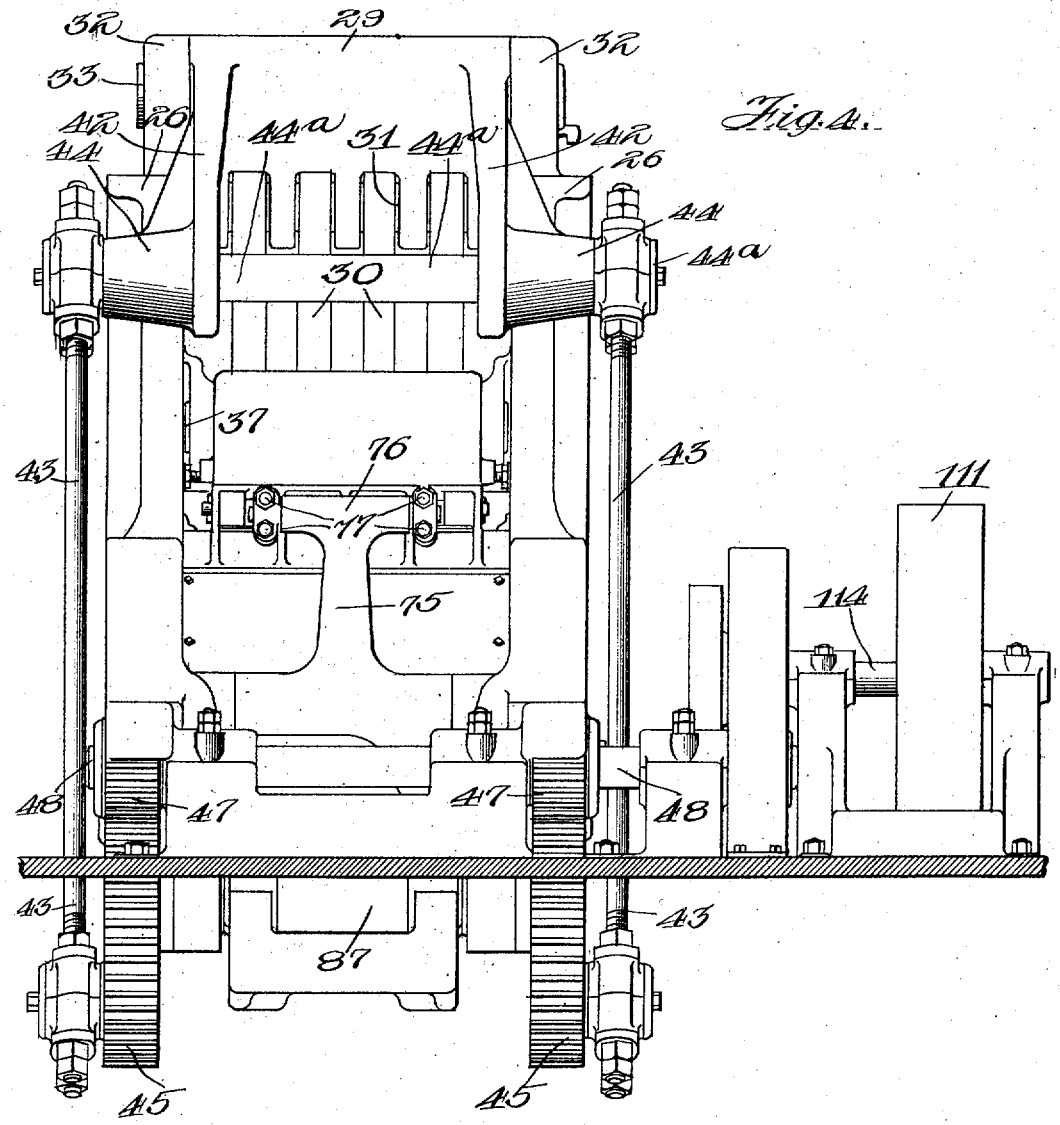
Figure 5:
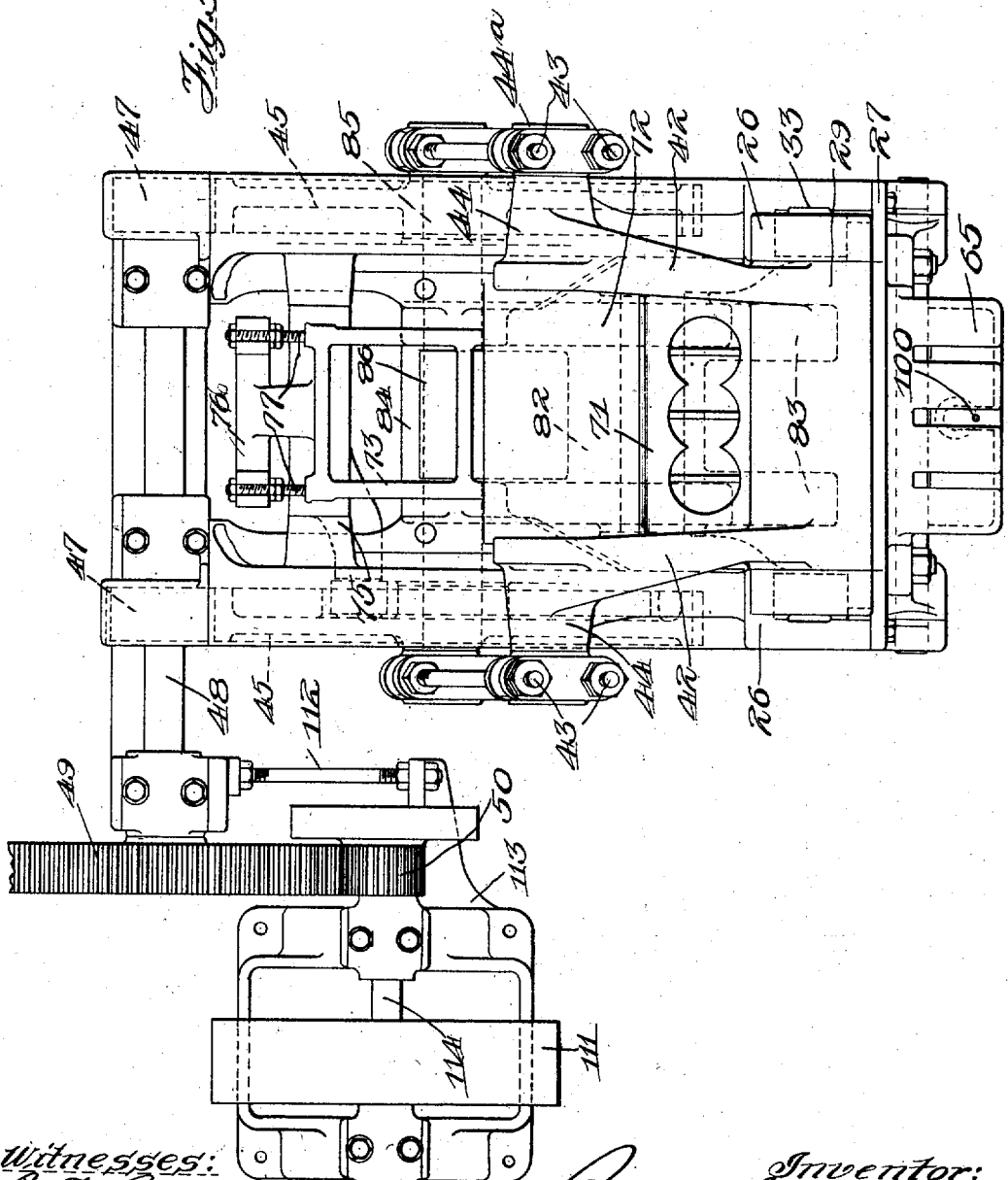
Figure 6:
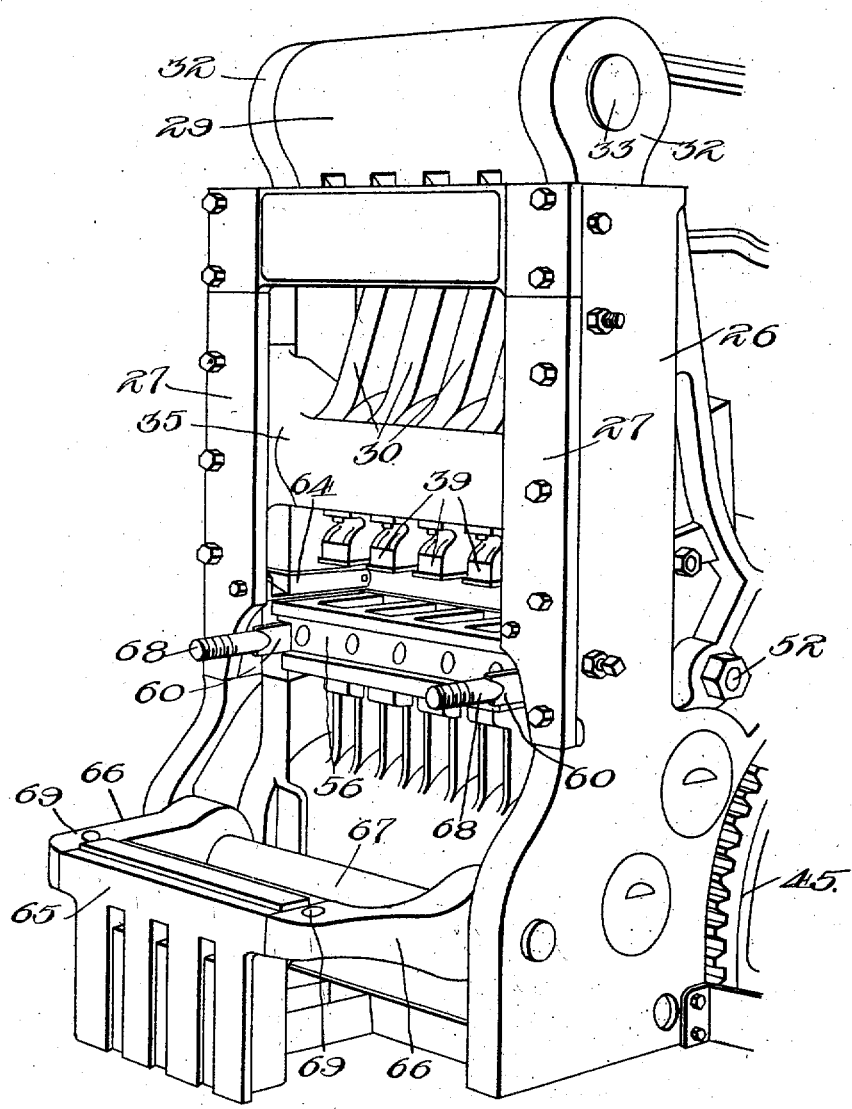
Figure 15:
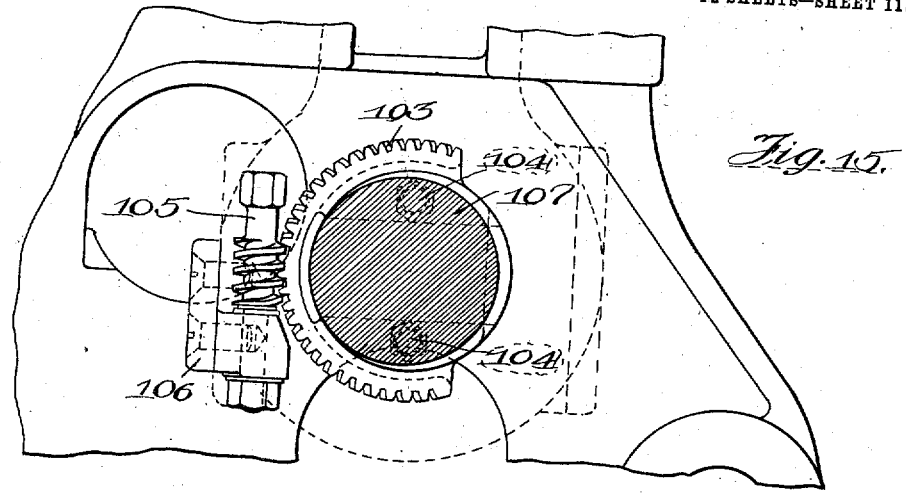
Figure 16:
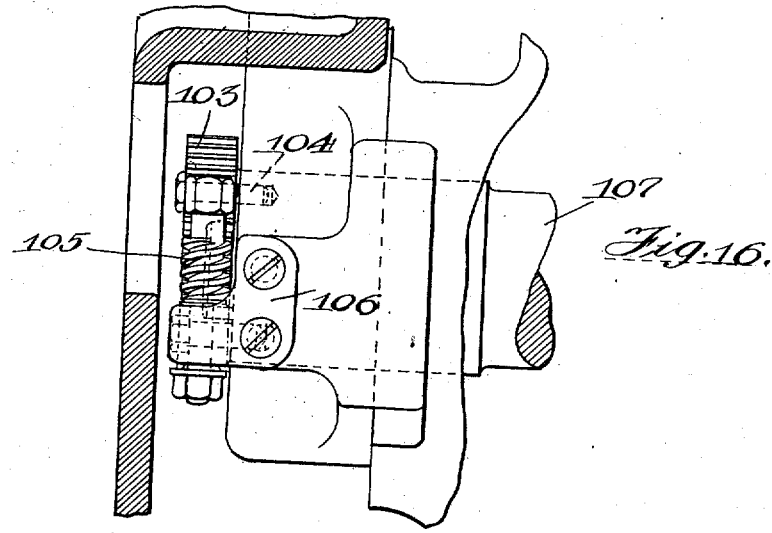
Figure 17:
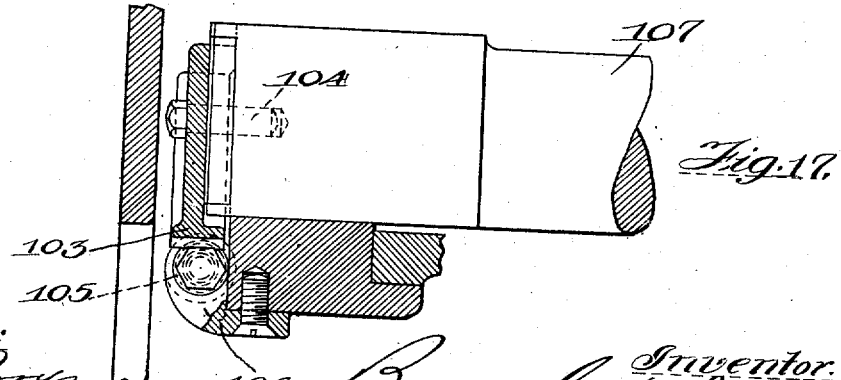

In the drawings:—Figure 1 is a central vertical section; Fig. 2 is a side elevation; Fig. 3 is a front elevation; Fig. 4 is a rear elevation; Fig. 5 is a plan view; Fig. 6 is a perspective view of the upper portion of the front part of the machine, showing the hinged front leaf of the table dropped down to permit the removal of the mold box or frame; Fig. 7 is a vertical section taken at line 7 7 of Fig. 1; Fig. 8 is a detail, partly in section, such section being taken at line 8 8 of Fig. 1, and showing the hinged frame that is attached to the rear end of the sliding charger plate that carries the feed box; Fig. 9 is a detail, being a plan view of the lever for lifting the lower cross-head, and parts connected therewith, in order to eject a finished brick from the mold, showing also the cam for operating such lever and also the adjusting lever that is fulcrumed to said lifting lever; Fig. 10 is a detail, being a section taken at line 10 10 of Fig. 9, and illustrating the manner in which the pillow-blocks interposed between the lifting lever and the lower cross-head are supported at their lower ends by said lifting lever; Fig. 11 is a plan view of the mold frame; Fig. 12 is a view of the mold frame, partly in section and partly in side elevation; Fig. 13 is a cross section through one of the molds, taken at line 13 13 of Fig. 12; Fig. 14 is a cross section through one of the partitions between the molds, taken at line 14 14 of Fig. 12; Fig. 15 is a detail, being an end elevation of the devices for effecting an adjustment of the heavy pin through which power from the lifting lever is transmitted to the lower cross-head, such devices being employed to compensate for wear. The pin referred to is shown in cross section; Fig. 16 is a detail, being an edge view of the devices shown in Fig. 15, the pin being shown in side elevation; Fig. 17 is a view, partly in plan and partly in section, of the devices shown in Fig. 16; Figs. 18, 19 and 20 are vertical sections representing the positions of the cross-heads and plungers carried thereby at various stages of the operation of the machine, the views being in part diagrammatic; and Fig. 21 is a view similar in character to the views in Figs. 18 to 20, in so far as being sectional and partly diagrammatic is concerned, but illustrating the position that will be assumed by the parts during the pressing operation if the lower plungers become stuck in the molds, or if the upper plungers for any reason fail to register with and enter the molds.

Referring to the several figures of the drawings, in which corresponding parts are indicated by corresponding reference characters, 25 indicates the frame work of the machine, from the opposite sides of which, at the forward end of the machine, rise two vertical bars 26, which, with front plates 27 bolted thereto, constitute guides for the sliding bars that connect the upper toggle member with the lower cross-head. As shown in Fig. 8, these front plates 27 are each provided with an inwardly extending rib 28, one side face of which bears against the inner face of its bar 26, and its end forms a stop for the forward face of the adjacent sliding bar; or, in other words, forms the forward portion of the guide for such bar.

29 indicates the upper toggle member, and 30 the lower toggle member, the lower toggle member consisting, in the construction shown, of a plurality of arms (see Fig. 7), the upper ends of such arms 30 entering suitably shaped recesses in the lower portion of the toggle member 29, and the two toggle members being held together, in the usual manner, by a pin 31. The upper ends of the arms that constitute the lower toggle member are suitably curved, and the ends of the recesses in the lower end of the upper toggle member into which said arms project, are correspondingly curved, as usual.

32 indicates the sliding bars hereinbefore referred to that move in the guides formed by the upright bars 26 and their front plates 27. These bars, at their upper ends, are attached to the upper toggle 29 by a suitable pin 33 passing through the said toggle member and sliding bars, and upon which pin the upper toggle member 29 is free to turn, the pin itself being held immovable by a suitable key 34, as best shown in Fig. 7, or otherwise.

35—36 indicate upper and lower cross-heads respectively, the upper cross-head being attached to the lower toggle member by means of a pin 37 passing through such cross-head and through the arms that constitute said lower member 30, such arms, in the construction shown, entering recesses formed in the cross-head, such lower ends of the arms, and the recesses in the cross-head, being formed as described for the upper ends of the arms and the recesses in the upper member of the toggle. The lower cross-head 36 is attached to the lower ends of the sliding bars 32 by means of a pin 38.

39 indicates a number of plungers attached to and depending from the upper cross-head 35, and 40 indicates similar plungers carried by the lower cross-head. Both sets of plungers are adapted to enter molds 41, into which material to be pressed has been fed, and to squeeze or press such material into bricks between the opposing faces of the two sets of plungers, all as hereinafter more fully described.

42 indicates rearwardly extending arms, which, in the construction shown, are integral with the upper toggle member 29. These arms, taken in connection with the upper toggle member, constitute in effect a bell crank lever, the short or forward side of the lever being the upper toggle member; and it is evident that an upward thrust applied at the outer or rear ends of the arms 42 would result in flexing the toggle by pulling backward and upward the jointing pin 31, the pin 33 in this movement constituting the bearing fulcrum for the bell crank. This flexing of the toggle by the upward movement of the arm 42 is accomplished through the medium of connecting rods 43 and suitable cranks to which such rods are connected at their lower ends. As shown, the outer or rear end of each arm 42 is provided with a laterally extending hub 44 which projects sufficiently from its arm to permit of the attachment against it just outside the frame of the machine, of the actuating rod members. As shown, there are two of these actuating rod members 43 at each side of the machine, and each pair of such actuating rods is attached to the projecting end of a shaft 44ª that passes through the hubs 44, such attachment being made in any suitable manner, and the rods are preferably made adjustable by nuts screwed thereon, as shown.

45 indicates large gear wheels, one at each side of the machine—each wheel being located, in the construction shown, in recesses in the side portions of the frame. To the outer face of each one of these gear wheels is affixed a crank pin 46, to which crank pins the lower ends of the actuating rods 43 are suitably attached. It is evident, therefore, that upon the rotation of these gears 45, the arm 42 will be moved up and down, causing a flexing and straightening of the toggles, and, of course, operating the plungers. These main gears are driven from pinions 47 fast on a shaft 48 upon which shaft is mounted a gear 49 that in turn is driven through a pinion 50 (see Figs. 1 and 5), such pinion 50 being mounted on a shaft that is driven from any suitable source of power.

51 indicates a horizontal table lying between the side plates of the main frame of the machine, such table being pivotally mounted on a pin 52 extending across the machine and mounted in the main frame. This table extends rearwardly for a considerable distance, and at its rear end is supported by an adjusting screw 53 that passes through a fixed bracket 54 into a socket piece 55 formed on the under surface of the table (see Fig. 1). By this construction, the table can be adjusted by means of the screw 53 to bring it to an absolutely level surface. Forward of this table is located the mold box or frame containing molds adapted to receive the material to be pressed into bricks by the action of the opposing plungers that enter such molds. The mold box or frame is rectangular in shape, and consists of front and rear plates 56, end blocks or plates 57, and partition plates 58. It is, of course, essential that the upper surface of the mold box or frame be maintained absolutely in line with the top of the table from which the material is fed to the mold box, and I therefore provide the forward edge of the table and the rear edge of the mold box or frame with a tongue and groove connection or other interlocking means, and the forward edge of the mold box or frame is similarly interlocked with the swinging leaf or extension hereinafter referred to. The mold box or frame has its end blocks or plates 57 cut away, as best shown in Fig. 12, to form shoulders 59, such shoulders resting upon the tops of tie-rods 60 (see Fig. 6), the inner ends of which tie-rods are preferably formed with eyes that surround the pin 52, as indicated in dotted lines in Fig. 1. The end blocks or plates 57 and partition plates 58 of the mold box or frame have projections at their ends that fit in correspondingly shaped openings in the side plates 56, and the said plates and end blocks or plates are secured together by short screws 61 which pass through the side plates 56 into the projections on the ends of the end blocks or plates 57 and partitions 58. These projections fitting into the openings in the plates 56 hold the partitions and end blocks or plates against vertical movement, and as an additional precaution against sidewise movement the said plates 56 are notched, as clearly shown in Fig. 11, to receive the ends of such partitions and end blocks or plates—a little space being left between the ends of these parts and the side plates 56. By tightening the screws 61, the plates 56 can be drawn up very tightly towards the end blocks or plates 57 and partitions 58, and such tightening will cause a binding of the lining plates of the mold, such lining plates being arranged, as best shown in Fig. 11, so that the ends of the side lining plates 62 bear against the faces of the end lining plates 63. It is evident that with this arrangement of the lining plates, the pressure exerted by the screws 61 will cause the ends of the side lining plates 62 to bear tightly against the inner faces of the end lining plates 63. The retention of these end and side lining plates is further assisted by providing each of them with one or more dowel pins that fit in suitable openings in the plates 56, and 57, and partitions 58, against which the lining plates respectively bear. The openings for the dowel pins, and the dowel pins themselves, are indicated clearly by dotted lines in Fig. 11.

64 indicates horizontal strips suitably secured to the uprights that constitute the guides for the sliding bars 32. These strips come over the ends of the mold boxes or frames (see Figs. 6 and 7), and are provided to keep dust out of such guides.

In the actual operation of machines of this character, the linings of the molds have to be renewed very frequently, and, as heretofore constructed, the renewal of such linings has necessitated stopping the machine for a very considerable period of time in order to take the linings of the mold out and replace them. Much time has been consumed owing to the manner of constructing the molds and the way in which they were secured in place—the lining plates having to be placed in position in the molds while such molds were in place in the machine. By my invention, however, I am enabled to make these necessary repairs with the loss of but very little time, and this result is attributable to the ease with which access can be had to the molds and the mold box removed and replaced by another while the one removed is being fitted with new lining plates. This easy access to the molds is permitted by providing that part of the table upon which the finished bricks are delivered from the molds with a hinged connection to the main frame. Referring to the drawings, 65 indicates this forward part of the table just referred to which is made in the form of a leaf that can be swung down out of the way when the mold box or frame is to be removed. This movable leaf has at each side two downwardly-extending arms 66 that are pivotally secured to a pin 67 extending across and secured in the front part of the main frame. In the upper ends of these supporting arms 66, are formed two holes of proper shape to adapt them, when the leaf is swung up, to be entered by the cylindrical forwardly-extending ends of the tie-rods 60, these cylindrical forwardly-extending ends clearly showing in Fig. 6. These ends are screw-threaded, and when the leaf is swung up into position, its upper surface will be level with the upper surface of the mold-box or frame, and it will be maintained in its raised position by reason of nuts screwed upon the projecting ends of the arms that pass through the holes referred to, thus clamping the rigid and hinged parts of the mold-table tightly together and holding the mold-box or frame immovably and in proper position for the plungers to enter the molds. Furthermore, the pressure exerted by thus clamping up the two parts of the table together tends to additionally bind the cross-pieces of the mold-box or frame and their side plates together. The cylindrical forwardly-projecting ends of the tie-rods are indicated by 68, and the holes in the arms 66 through which these screw-threaded ends pass are indicated by 69.

70 indicates a feed box or charger adapted to receive material from a hopper 71, such hopper being kept supplied with material by any suitable means. The feed box or charger is open at its bottom, so that when pushed forward, the material carried thereby will be dropped into the molds, as is well understood. In the rear of the feed-box proper, is a cut off plate 72 adapted to shut off the supply of material from the hopper 71 when the feed box is moved forward to fill the molds.

73 indicates a rectangular frame composed of side bars and end bars and pivotally connected at its forward end to downwardly-turned flanges of the cut off plate 72. As shown (see Fig. 8), this frame 73 is connected at its forward end to the charging device by a pin 74 passing through the frame 73.

75 indicates a lever, which, in the construction shown, is located below the rectangular frame 73 and substantially centrally thereof. Such lever is provided with a head 76 at its upper end, the ends of which extend to points opposite the side bars of the said frame 73, and connection is made between said frame and the head of said lever by means of screw-threaded rods 77 and clamping blocks 78 held adjustably therein by nuts screw-threaded onto the rods 77. To these clamping blocks 78 the head 76 of the lever 75 is pivotally attached by means of a pin 79 passing through suitable brackets depending from such clamping blocks. The frame 73 is thus made adjustable forward and back, so that the feed-box or charger can be very accurately adjusted. By providing a frame comprising cross-bars near the ends of the side pieces a very rigid device is produced for connecting the operating lever and the feed-box. The feed-box or charger is actuated through the frame 73 and the lever 75 by the engagement of such lever at its lower end with a suitable cam. This cam is formed with or carried by one of the gear wheels 45, and the lower portion of the lever is laterally curved towards the cam. The lower end of the lever has journaled to it a roller for engaging the cam groove. The lever 75 is mounted on a pin 81 secured in the frame-work of the machine.

After the pressing of the material into brick form between the opposing plungers has been accomplished.

it is of course necessary that such operation be immediately followed by an upward movement of the lower plunger, in order to eject the brick from the mold. I provide for doing this in my improved machine by means of a heavy lifting lever secured near the bottom of the frame-work and acting through suitable interposed devices directly upon the under side of the heavy pin 38 heretofore referred to that connects the sliding bars 32 with the lower cross-head. The said lifting lever is pivotally mounted upon a pin 82 extending across the machine and supported in the lower portion of the frame-work, said lifting lever being indicated by 83, and consisting, in the construction shown, (see Figs. 9), of two heavy parallel bars spaced a suitable distance apart and joined together at their rear ends by a suitable cross piece, such cross piece being indicated by 84. The side bars of the lifting lever are considerably higher at their point of connection with the pin 82 than at their ends, this shape being of advantage in enabling the power to be properly applied from the shaft of the main driving gears 45. Formed upon or with this shaft, which is indicated by 85, is a wide cam 86 adapted by its rotation to force the rear end of the lifting lever 83 downward. This cam, in the construction shown, does not operate directly upon the end of the lever, but upon a roller 87 of substantially the same width as the cam 86, said roller being suitably journaled in the opposite sides of the lever 83, as best shown in Fig. 9. Each side of the lever 83, at its forward end, supports an upright lifting-bar 88, the upper end of which is curved to conform to the curvature of the said pin 38 that passes through the lower cross-head, and acting to support said pin and the sliding bars 32 that are carried thereby, and, when said lever is moved to force the lifting-bars and the pin 38 upward against the lower plungers, to also support said cross-head and cause it and its attached plungers to move upward. These lifting-bars, as clearly shown in Fig. 19, are rounded at their lower ends, and stepped in bearing blocks 89 inserted in the upper faces of the said bars 83.

90 indicates a short lever forked at its inner and outer ends (see Fig. 9), the forked ends projecting between the forward ends of the sides of the lifting lever 83, to which lifting lever 83 this lever 90 is pivotally attached by a pin 91 having its ends secured in the said side bars of the said lifting lever. Forward of the pivot pin 91 that joins these two levers together, is a block 92 that is free to rock backward and forward, as required, on short trunnions 93 that rest in suitable bearings formed in the upper edges of the rear fork members. Through this rocking block passes a bolt 94 carrying at its upper end a head 95, between which head and the rocking block 92 is interposed a coiled spring 96 tending to hold said bolt 94 in a raised position, the limit of movement upward of such bolt being regulated by one or more nuts 97 screwed onto its lower end, and, by coming in contact with the lower face of said rocking block 92, regulating the height to which said bolt can be raised. By the adjustment of these nuts, the position of the head 95 is regulated in relation to the trunnions 93.

98 indicates a rod, screw-threaded at its lower portion, upon which screw-threaded portion is screwed a block 99ª. Such block has projecting from its opposite sides short trunnions 99ᵇ, and these trunnions are engaged by the forward forks of the lever 90, the ends of such forward forks being recessed on their under sides to fit over such trunnions, as best shown in Fig. 2. The upper end of the rod 98 is provided with a head 99 (see Fig. 1) that is supported in a suitable socket formed in the under side of the hinged leaf 65, such engagement of the head 99 preventing the rod 98 and the forward end of the short lever 90 that bears thereon from moving downward. The under side of the hinged leaf 65 is properly slotted to allow the rod 98 to be swung into and out of engagement with the said hinged leaf, and when in position it is held against accidental disengagement with such leaf by a removable pin 100. The moving of the rod 98 into and out of engagement with the said hinged leaf is readily accomplished when the weight of the lower cross-head has been taken off of the bolt 94 that is carried by the short lever 90, and transferred to and sustained by the lifting bars that are carried by the lifting lever 83. The rod 98 is provided with a hand-wheel 101 by which the rod may be turned in its block 99ª. The turning of this rod causes, of course, a movement of the lever 90 on its fulcrum pin 91, and also moves the bolt 94 so that thereby the position of the lower plungers in the mold will be regulated to adapt such molds to receive the desired amount of material. During the lifting operation, the weight of the lower cross-head and attached parts is entirely borne by the lifting lever 83, and, as this lower cross-head is forced up by said lever 83, said lower cross-head will be entirely removed from contact with the bolt 94, or the head 95 secured to its upper end, and such bolt, owing to the necessary turning of the short lever 90 on its fulcrum support 91, will be free to turn out of a direct line, and will so turn, such turning being permitted by the rocking of the studs or trunnions 93 in their bearings. The position assumed by such forward lever 90 and its attached parts at the time that the lower plungers are raised and held by the other and larger lever 83 is indicated in Fig. 19. The independent supporting and moving of the cross-head through the rod 98 and forward lever 90 is permitted by reason of the provision of a slot 102 in the cross-head, through which slot the heavy pin 38 passes. The location of the hand-wheel 101 through which the rod 98 is operated is a very convenient one, as it is at a point convenient to the attendant, and this is of considerable importance, inasmuch as it is quite frequently necessary in the operation of the machine to slightly vary the position of the lower plungers so as to receive a greater or less quantity of material in the molds, such adjustment being required by variations in the character and condition of the material, as is well understood.

In addition to providing adjusting devices for regulating the distance to which the lower plungers will descend into the molds and remain at rest to receive the proper amount of material, it is also highly desirable that means be provided for effecting a very fine adjustment of the proper parts to always insure the lower plungers being raised so as to be perfectly flush with the surface of the table upon which the finished brick is to be pushed; for, if this surface were not absolutely flush, it would, of course, tend to mar the appearance of the brick in practically every instance. I provide for making this adjustment from time to time as may be required by making those portions of the pin 38 that rest upon the lifting-bars 88 eccentric to the remainder of the pin and securing to one end of the pin 38 a segmental worm-gear 103,—securing it by means of a block formed with it which projects into a correspondingly-shaped recess formed in the end of a shaft, such block being indicated by dotted lines in Figs. 15 and 17, and employing screws 104 to hold the worm-gear in place. A worm adapted to mesh with this worm-gear is formed on the bolt 105, which worm is carried by a suitable bracket 106 secured in any suitable manner to the adjacent sliding bar 32. The pin 38, when first placed in the machine, is placed on the lifting bars so that the lowest portions of the eccentrics bear on such lifting bars, and by reason of the engagement of the worm-gear and worm, this position will not be liable to accidental disturbance; and, when wear necessitates a slight elevation of the cross-head 36 with respect to its supporting pin 38, such pin can readily be given the required amount of turn by the application of a wrench or other tool to the head of the bolt 105, access being permitted to this bolt through a suitable opening in the frame of the machine. The eccentric portions of the pin 38, to which reference has been made, are indicated by 107.

It sometimes occurs that the lower plungers will stick in the molds after having been raised high enough to eject the brick that has just been formed. In order to release such plungers from the molds and start them positively in their downward movement, I bolt short upright bars 108 to the front plates 27, to which I attach a cross piece 109 adapted to be engaged by a curved projection on the front of the upper toggle member when the rearwardly-extending arm 42 is pulled down. The pulling down of this arm 42 at this time causes the projection 110 to bear against the cross-piece 109 as a fulcrum with the effect, of course, of applying great downward pressure to the sliding bars 32, thus forcing the lower plungers downward in the mold. These parts, 108, 109 and 110, will not, of course, come into use except under exceptional circumstances. I have not deemed it necessary to show these parts on all the figures of the drawings, but they will be found fully illustrated in Figs. 18 to 21, inclusive, and in the last-named figure they are shown as in actual use; and, in that same figure, it will be noted that the cam 86 is out of engagement with the roller 87. This disengagement of these two parts will ordinarily not occur, as with the machine working properly these parts will always be in contact, as shown in the remaining figures.

I have shown (see Fig. 5) the driving pulley, indicated by 111, as mounted in a frame separate from that of the press, and in order to bind the two frames securely together, and at the same time permit of such slight adjustments of parts as may be necessary from time to time, I make the union between the two frames by means of a tie-rod, which is indicated by 112. The rear end of this tie-rod is connected to the support for the projecting end of the shaft 48, and its other end engages an arm 113 projecting from the frame in which is mounted the said driving pulley 111, upon the shaft 114 of which is keyed the pinion 50. The end of the tie-rod is screw-threaded, and upon it are screwed nuts by which the tie-rod may be secured in proper position. Such manner of securing the two frames together enables accurate adjustment to be had, such adjustment being sometimes necessary when a new gear is placed in position, or when the parts have become worn, or for other cause.

Briefly, the operation of the machine as a whole is as follows: With the toggle members flexed backwardly to about the limit of their normal movement—as, for example, in the diagrammatic view of Fig. 20—the brick that has last been pressed has been pushed forward by the front wall of the feed box or charger onto the hinged leaf 65 that forms the receiving or forward portion of the table from whence it will be removed by hand or otherwise; and, as this is being accomplished, a fresh charge of material from the feeding box has been deposited in the molds, such material resting upon the upper faces of the lower plungers, and the feed box is being withdrawn toward the rear of the table upon which it rests. At this time the lifting lever 83 is not exerting any upward pressure at its forward end owing to the shape of that portion of the cam 86 that is engaging the roller 87 carried by said lever; but, on the contrary, its forward end is in its lowermost position, being held there by the weight of the lifting bars and the weight imposed thereon—this weight at the forward end of the lever 83 insuring the retention, under all normal working conditions, of the engagement of said roller 87 and cam 86. As the cranks on the main gears, to which the connecting rods 43 are attached, pass their highest points—that is, their upper dead centers—and commence to descend, the rearwardly-extending arm 42 will be started on its downward movement, causing the toggle members to approach more and more nearly to alinement with each other. This straightening movement of the toggle members forces the upper plungers into their respective molds, and pressure commences to be applied to the material in the molds. Just before the time that the toggles are straightened, the lower cross-head is forced down and seated upon the pin 38, the spring 96 that had theretofore supported it being collapsed; the cam 86 is then turned sufficiently to cause the forward end of the large lifting lever 83 to be raised to force the heavy pin 38 slightly upward and with it the lower plungers, bringing the parts into the position shown in Fig. 1, thus giving to the material in the molds the desired proportion of pressure on both upper and lower surfaces. Owing to the shape of the cam, the pressure of both the upper and lower plungers on the material in the molds continues while the said lever 83 is continuing to force upward the lower cross-head, such upward movement also forcing upward, of course, the upper cross-head 35, the sliding bars 32 and the toggle. The advantages of subjecting the material to pressure on both sides, and at the same time sliding the pressed material bodily in the molds, is readily understood. As the cranks approach their lower dead center position, the arm 42 is drawn down so as to cause the toggle to flex very slightly forward, as shown in Fig. 1, thus easing up the pressure on the material. Upon the further movement of the cranks the toggle members are again straightened, giving a final pressure upon the mold as the upper plungers commence withdrawal from the mold. This withdrawal of the upper plungers from the mold is made gradually, such withdrawal of the plungers being permitted by the vertical movement of the fulcrum of the arm 42—namely, the pin

33—at the same time that the beginning of the flexing motion takes place. This gradual withdrawal of the upper plungers from contact with the newly made bricks that are being ejected from the molds insures a more perfectly finished brick, as thereby suction, or "plucking" of the bricks as it is termed, is avoided. This combined movement of the toggle and the said fulcrum acts to advantage in the following particulars: When the sliding bars 32 are lowered, the lowering of the fulcrum 33 of the arm 42 tends to further flex the toggle, thus causing the upper toggles to be sustained for a great period of time in their highest position, thereby affording sufficient clearance for the feed box or charger,—or, to state the matter more clearly, the up and down swing of this arm 42 so co-acts with the up and down movement of its fulcrum 33 that the flexing of the toggle is first retarded, as described, then quickened to raise the upper plungers clear of the feed box or chargers, then retarded, and then quickened to bring down the upper plungers to the molds after the feed box or charger has been retracted to its position under the hopper 71.

In addition to the advantages that have been specified, my invention provides a machine in which, by reason of its peculiar construction, other important advantages are attained. For example, the toggle is flexed to the rear instead of in front of the machine, as has heretofore been the case in machines of this character, thus at all times working in a direction away from the attendant, whose position is necessarily in front of the machine. Again, by reason of the rearwardly-extending arm 42 that is connected with the toggle members having its connections to the cranks through connecting rods attached at its rear end and also having a vertical moving fulcrum at the toggle end, such arm has a varied angular movement, differing from that of a toggle having, as is usually the case, a horizontal connecting rod extending from its middle joint to a crank in the rear, and differing also in movement from that which it would have if its fulcrum were fixed. For example, when the rear of this arm is being raised to flex the toggle members and release the pressure, the side bars are also rising to eject the brick, and the fulcrum of the said arm rising with the bars decreases the flexing of the toggles with the result hereinbefore stated. Again, I am enabled to realize the greatest advantage from the toggle, as, by my construction, the toggle is flexed until its two members are practically at right angles to each other, and by this movement it is evident that the toggle acts quickest when flexed for a given end-wise movement or toggle opening. It will be noted that the upper toggle member is quite short, such toggle member being, as before explained, formed by the short side portion of the actuating arm itself, and, inasmuch as the arm is very considerably longer than the said upper toggle member, the stress upon the crank pins and connecting rods is proportionately reduced with a consequent reduction in friction. By the arrangement of the rearwardly-flexing toggle I am enabled to place the main shaft of the machine in a most advantageous position, namely, close to the foundations, and, by locating the main gears 43 in line with the side portions of the main frame—or, as it may be otherwise described, in recesses in the main frame—I protect these gears from falling grit; and, by such location of the gears, the entire space between the side portions of the frame may be utilized for the lifting cam. Furthermore, this position of the main shaft and main gears permits of the most effective arrangement of the large lifting lever 83, as well as of the lever 75 through which the feed box or charger is moved.

What I claim as new and desire to secure by Letters Patent, is:—

1. In a press, the combination of two opposed plungers, a toggle connected with said plungers, the connection between one member of the toggle and one of the plungers consisting of vertically-sliding side-bars, a lever attached to the middle joint of said toggle, a fulcrum for said lever mounted in fixed bearings in said sliding connection, and means for flexing said toggle by moving said lever, substantially as described.

2. In a press, the combination of a toggle, an operating lever forming one member of the toggle, a sliding bar having a connection with one member of said toggle, a fulcrum mounted in fixed bearings on said sliding bar for said lever, and means for moving said lever to operate said toggle, substantially as described.

3. In a press, the combination of a toggle, an operating lever forming one member of the toggle, a sliding bar connected by a pin to the lever-member of said toggle, said pin constituting a movable fulcrum for said lever, means for moving said lever to operate said toggle, a lifting lever adapted to move said sliding bar, and means for moving said last-named lever, substantially as described.

4. In a press, the combination of a toggle, an operating lever connected with said toggle at its joint, a vertically sliding bar connected by a pin to one member of said toggle, said pin passing through said operating lever and constituting a movable fulcrum therefor, a downwardly extending rod connected with said lever, crank mechanism for moving said rod, a lifting lever, connecting means between the lower end of said sliding bar and the forward end of said lifting lever, and a cam adapted to depress the inner or rear end of said lifting lever, substantially as described.

5. In a press, the combination of a toggle, an operating lever connected with the middle joint of the toggle, a vertically sliding bar connected by a pin to one member of the toggle, said pin passing through said operating lever and constituting the moving fulcrum therefor, a downwardly extending rod connected with said lever, crank mechanism for moving said rod, a lifting lever, a lifting bar stepped in said lifting lever, a cross support carried by said sliding bar and bearing upon the upper end of said lifting bar, and a cam adapted to depress the inner or rear end of said lifting lever, substantially as described.

6. In a press, the combination of a toggle, a plunger carried by one of the members of the toggle, a second plunger, vertically sliding bars connecting said second plunger to the other member of the toggle, a bell crank lever attached at the middle joint of the toggle and fulcrumed to the sliding bars, a downwardly extending rod attached to said bell crank lever, crank mechanism for moving said rod, and means independent of the toggle for moving said plungers, substantially as described.

7. In a press, the combination of an upper and lower plunger, a toggle, with the two members of which said plungers are respectively connected, a machine-frame comprising two side portions, two gear wheels located in recesses in said sides of the frame, a shaft on which said gear wheels are mounted, a lifting lever adapted at its forward end to exert an upward pressure on said lower plunger, a cam on the central portion of said shaft adapted to bear on the rear end of said lifting lever, cranks on said gear wheels, and devices operated by said cranks for flexing and straightening said toggle, substantially as described.

8. In a press, the combination of an upper and lower plunger, a toggle, with the two members of which said plungers are respectively connected, a machine-frame comprising two side portions, two gear wheels located in recesses in said sides of the frame, a shaft on which said gear wheels are mounted, a lifting lever adapted at its forward end to exert an upward pressure on said lower plunger, a cam on the central portion of said shaft adapted to bear on the rear end of said lifting lever, cranks on said gear wheels, connecting rods attached to said cranks, a bell crank lever connected to the said rods, said bell crank lever being connected to the joint of said toggles, and a movable fulcrum for said bell crank lever, substantially as described.

9. In a press, the combination with a mold, of a plunger entering said mold from below, a lifting lever, means connected with said lever for providing beneath the plunger a yielding support for the plunger, means for moving said lever, and other means carried by said lever for sustaining the plunger above its said yielding support, substantially as described.

10. In a press, the combination with a mold, of a plunger entering said mold from below, a lifting lever, means connected with said lever for providing a pivoted yielding support for the plunger, means for moving said lever, and other means carried by said lever for sustaining the plunger above its said pivoted yielding support, substantially as described.

11. In a press, the combination with a mold, of a plunger entering said mold from below, a lifting-lever, a second lever pivotally connected to the lifting lever, a yielding support carried by said second lever adapted to sustain the plunger when the lifting-lever is depressed at its acting end and to be turned into an inclined position and out of supporting position when the acting end of the lifting-lever is raised, and means for moving said lifting-lever, substantially as described.

12. In a press, the combination with a mold, of a plunger entering said mold from below, a main lifting lever fulcrumed in the frame of the machine and adapted to raise said plunger, an auxiliary lever pivoted at one of its ends to the main lifting-lever and adjustably supported at its other end, a yielding support between the ends of said auxiliary lever for sustaining the said plunger in certain positions of said two levers, and means for operating said lifting-lever, said auxiliary lever being brought into and out of operative position through its change in angular position, substantially as described.

13. In a press, the combination with a mold, of a plunger, a slotted cross-head carrying said plunger, a pin passing through the slot in the cross-head, a lifting lever, a rigid support for said pin connected with said lever, a yielding support for the cross-head connected with said lifting lever, and means for moving said lever to lift the cross-head off of said yielding support and force the plunger up into the mold, substantially as described.

14. In a press, the combination with a mold, of a plunger, a slotted cross-head carrying said plunger, a pin passing through the slot in the cross-head, a lifting lever, a rigid support for said pin connected with said lever, a second lever pivoted to said lifting lever, a spring-support carried by said second lever and adapted to support the cross-head, and means for moving said lifting lever to transfer the weight of the cross-head to said pin, substantially as described.

15. In a press, the combination with upper and lower cross-heads and means for moving them toward and away from each other, of means for giving an independent vertical adjustment to the lower cross-head, comprising a lever pivoted at its rear end, a rocking block supported by said lever, a bolt passing through said block and having a head adapted to come in contact with the cross-head, a spring interposed between said block and head, and means for adjustably supporting the outer end of said lever, substantially as described.

16. In a press, the combination with upper and lower cross-heads, and means for moving them toward and away from each other, of means for giving an independent vertical adjustment to the lower cross-head, comprising a lever, a pivot passing through its end and through a suitable support, a block having trunnions carried by said lever, a bolt passing through said block and having a head adapted to come in contact with the cross-head, a spring interposed between said block and head, a second rocking block upon which the forward end of said lever is adapted to bear, a screw-threaded rod engaging said second-named block, and means for holding said rod, substantially as described.

17. In a press, the combination with upper and lower cross-heads carrying plungers adapted to enter a mold, of a toggle adapted to move said cross-heads, the lower cross-head being slotted, a pin in said slot, sliding bars connected at their lower ends to said pin and at their upper ends to the upper member of the toggle, means for operating said toggle, a lifting lever, means carried by said lifting lever for engaging the pin that passes through the slot in the lower cross-head, and means for actuating said lifting lever to raise the cross-head, substantially as described.

18. In a press, the combination with upper and lower cross-heads carrying plungers adapted to enter a mold, of a toggle adapted to move said cross-heads, the lower cross-head being slotted, a pin in said slot, sliding bars connected at their lower ends to said pin and at their upper ends to the upper member of the toggle, means for operating said toggle, a lifting lever, a lifting-bar stepped in the forward end of said lifting lever, and supporting at its upper end the pin that passes through the slot in the lower cross-head, and means for actuating said lifting lever, substantially as described.

19. In a press, the combination with upper and lower cross-heads carrying plungers adapted to enter a mold, of a toggle adapted to move said cross-heads, the lower cross-head being slotted, a pin in said slot, sliding bars connected at their lower ends to said pin and at their upper ends to the upper member of the toggle, means for operating said toggle, a lifting lever, means carried by said lifting lever for engaging the pin that passes through the slot in the lower cross-head, means for actuating said lifting lever to raise the lower cross-head, a second lever pivoted to the said lifting lever, and yielding devices carried by said second lever for regulating the position at which said cross-head shall come to rest, substantially as described.

20. In a press, the combination of a supporting frame comprising two side portions, a table pivotally supported in said frame, and means for adjusting the level of said table by turning it on its pivot, substantially as described.

21. In a press, the combination of a supporting frame and a mold table secured thereto, said mold table having a hinged front portion, substantially as described.

22. In a press, the combination of a frame, a mold box therein, horizontal guides for the said mold box to move upon, and a swinging table section adapted to be turned up in front of said mold box, substantially as described.

23. In a press, the combination with a table consisting of a fixed and a movable portion, of a removable mold box clamped between said table portions, said mold box comprising a frame and removable liners supported therein, substantially as described.

24. In a press, the combination of a mold table having a fixed rear part and a front hinged part, a mold interposed between said parts, and means for locking the said two parts of the table together, substantially as described.

25. In a press, the combination of a mold table having a fixed rear part and a front hinged part, a mold interposed between said parts, means for interlocking the two parts of the table with the mold, and means for securing the hinged part of the table in position, substantially as described.

26. In a press, the combination of a mold table having a fixed rear part and a front hinged part, a mold interposed between said parts, each of said table parts interlocking with said mold, and tie-rods carried by said fixed part of the table and projecting through the hinged part, substantially as described.

27. In a press, the combination of a frame, a mold-box therein, horizontal guides for said mold-box to move upon, said guides having their outer ends screw-threaded, a swinging table section adapted to be turned into position in front of said mold-box and having openings through which pass said screw-threaded ends of the guides, and nuts screwed upon said guide ends to clamp the swinging table section against the mold-box, substantially as described.

28. In a press, the combination of a frame, a rear table section supported thereby, a pin for attaching said table section to the frame, tie-rods connected to said pin and extending forward therefrom, a front hinged table section, and means for securing said tie-rods to said hinged table section to hold it in position, substantially as described.

29. In a press, the combination of a frame, a rear table section supported thereby, tie-rods extending forward from said rear table section and adapted to serve as horizontal guides, a mold box movable upon said guides, a swinging table section through which said tie-rods pass, and means carried by said tie-rods for clamping said swinging table section in place, substantially as described.

30. In a press, the combination with a table, of a feed box adapted to be reciprocated thereon, a rigid frame pivotally connected therewith, two bars extending rearwardly from said rigid frame, a pivoted operating lever having a cross-head at its upper end connected to said two rearwardly extending bars, and a cam for engaging the lower end of said lever, substantially as described.

31. In a press, the combination of two opposed plungers, a toggle connected with said plungers, the connection between one member of the toggle and one of the plungers being a sliding connection, a lever attached to the middle joint of said toggle and fulcrumed on said sliding connection, said lever being provided with a short projection beyond its fulcrum, means for moving said lever, and a fixed stop adapted to be engaged by the said projection when the normal operation of the plungers is interfered with, substantially as described.

32. In a press, the combination of two opposed plungers, a toggle connected with said plungers, the connection between one member of the toggle and one of the plungers being a sliding connection, a lever attached to the middle joint of said toggle and fulcrumed on said sliding connection, said lever being provided with a short projection beyond its fulcrum, means for moving said lever, and a stop adapted to be engaged by the said projection when the plunger carried by said sliding connection is accidentally caught and held in its raised position, substantially as described.

BRUCE C. WHITE.

Witnesses:
ALBERT H. ADAMS,
MINNIE A. HUNTER.